United States Patent
Wang et al.

(10) Patent No.: US 8,553,693 B2
(45) Date of Patent: Oct. 8, 2013

(54) NETWORK CONTROLLER CIRCUITRY TO ISSUE AT LEAST ONE PORTION OF PACKET PAYLOAD TO DEVICE IN MANNER THAT BY-PASSES COMMUNICATION PROTOCOL STACK INVOLVEMENT

(75) Inventors: Ren Wang, Portland, OR (US);
Tsung-Yuan C. Tai, Portland, OR (US);
Christian Maciocco, Portland, OR (US);
Rajendra S. Yavatkar, Portland, OR (US); Lakshman Krishnamurthy, Portland, OR (US); Michael J. Espig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 12/721,275

(22) Filed: Mar. 10, 2010

(65) Prior Publication Data
US 2011/0222537 A1    Sep. 15, 2011

(51) Int. Cl.
*H04L 12/56* (2011.01)
(52) U.S. Cl.
USPC ........................................... 370/392
(58) Field of Classification Search
USPC ........................................ 370/230, 389, 392
See application file for complete search history.

(56) References Cited

U.S. PATENT DOCUMENTS

| | | | |
|---|---|---|---|
| 6,246,683 B1 * | 6/2001 | Connery et al. | 370/392 |
| 8,121,135 B2 * | 2/2012 | Thathapudi et al. | 370/401 |
| 2002/0147839 A1 | 10/2002 | Boucher et al. | |
| 2004/0010612 A1 | 1/2004 | Pandya et al. | |
| 2006/0248191 A1 | 11/2006 | Hudson et al. | |
| 2007/0223472 A1 * | 9/2007 | Tachibana et al. | 370/389 |
| 2008/0240130 A1 | 10/2008 | Oved | |

FOREIGN PATENT DOCUMENTS

| WO | 2011/112787 A2 | 9/2011 |
|---|---|---|
| WO | 2011/112787 A3 | 12/2011 |

OTHER PUBLICATIONS

PCT Search Report for Application No. PCT/US2011/027851, mailed on Nov. 4, 2011, 11 pages.
Sapuntzakis, C. et al., "TCP RDMA option", draft-csapuntz-tcprdma-00.txt, Internet Draft, Feb. 2000, pp. 1-19.
Johansson, I. et al., "Support for Reduced-Size Real-Time Transport Control Protocol (RTCP): Opportunities and Consequences", Network Working Group, Category: Standards Track, Apr. 2009, pp. 1-17.
Postel, J. "User Datagram Protocol", RFC 768, Aug. 28, 1980, pp. 1-3.

(Continued)

*Primary Examiner* — Dang Ton
*Assistant Examiner* — Kevin Lee
(74) *Attorney, Agent, or Firm* — Christopher K. Gagne (57) ABSTRACT

An embodiment may include network controller to be comprised in a first node. The node may be communicatively coupled to a network and may include a host processor to execute an operating system environment. The operating system environment may include, at least in part, a communication protocol stack and an application. The circuitry may receive, at least in part, a packet from the network. The packet may include, at least in part, a header and payload. At least one portion of the payload may be associated with the application. The circuitry may issue at least one portion of the header to the stack. The circuitry may issue the at least one portion of the payload to a destination device in a manner that by-passes involvement of the stack. The destination device may be specified, at least in part, by the application. Many alternatives, variations, and modifications are possible.

18 Claims, 5 Drawing Sheets

(56) References Cited

OTHER PUBLICATIONS

Schulzrinne, H. et al., "RTP: A Transport Protocol for Real-Time Applications", Network Working Group, Category: Standards Track, Jul. 2003, pp. 1-89.
Intel, "Intel Ethernet Controllers and PHYs", copyright 2009, 2 Pages. Document available at: http:// intel.com/go/ethernet.
Sapuntzakis, C. et al., "The Case for RDMA", Internet-Draft, draft-csapuntz-caserdma-00.txt, Dec. 2000, pp. 1-28.
Culley, P. et al., "Marker PDU Aligned Framing for TCP Specification", Version 1.0,, draft-culley-iwarp-mpa-v1.0, Oct. 25, 2002, pp. 1-32.
Ko, M. et al., "iSCSI Extensions for RDMA Specification", Version 1.0, draft-ko-iwarp-iser-v1.0, Jul. 2003, pp. 1-76.
Pinkerton, J. et al., "Sockets Direct Protocol (SDP) for iWARP over TCP (v1.0)", draft-pinkerton-iwarp-sdp-v1.0, Oct. 31, 2003, pp. 1-106.
Pinkerton, J. "Requirements for an RDMA Protocol", Internet Draft , Category: Informational, draft-pinkerton-rdma-reqmts-00.txt, Jun. 2001, pp. 1-10.
Recio, R. et al., "An RDMA Protocol Specification", Version 1.0, draft-recio-iwarp-rdmap-v1.0, Oct. 2002, pp. 1-60.
International Preliminary Report and Written opinion for PCT Patent Application No. PCT/US2011/027851, mailed on Sep. 20, 2012, 6 pages.

* cited by examiner

NETWORK CONTROLLER CIRCUITRY TO ISSUE AT LEAST ONE PORTION OF PACKET PAYLOAD TO DEVICE IN MANNER THAT BY-PASSES COMMUNICATION PROTOCOL STACK INVOLVEMENT

FIELD

This disclosure relates to network controller circuitry to issue at least one portion of a packet payload to a destination device in a manner that by-passes communication protocol stack involvement, such as, for example, for data transfer while still performing one or more communication protocol control operations.

BACKGROUND

In one conventional computing arrangement, a network input/output (I/O) device in a first host computer receives packets from a second host computer. The device stores the received packets in host memory in the first host computer. A communication protocol stack executed by a host central processing unit (CPU) in the first host computer processes the packets' headers and copies the packets' payloads to user space in the memory. An application executed by the CPU processes the payloads and transmits data from the payloads to one or more I/O devices of the first host computer. Such I/O devices may include host storage, audio, and/or display devices.

The above type of packet processing comprises a significant number of operations involved in transferring and copying packet data to and from memory in the first host computer. These operations may impose an undesirably large amount of CPU processing overhead, consume an undesirably large amount of CPU processing bandwidth, reduce the CPU's performance, and increase the CPU's power consumption and heat generation. Furthermore, these operations may result in the first host computer's actual packet processing throughput being significantly lower than the network's data transfer rate.

In other conventional arrangement, the network I/O device executes a complete copy of the communication protocol stack so as to permit all of the communication protocol stack's processing to be offloaded from the CPU to the network I/O device. Unfortunately, this conventional arrangement significantly increases the cost of the first host computer.

In yet another conventional arrangement, the stack is modified to reduce the CPU's processing burden. Unfortunately, the modifications made to the stack may result in protocol, technological ecosystem, and operating system compatibility problems.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
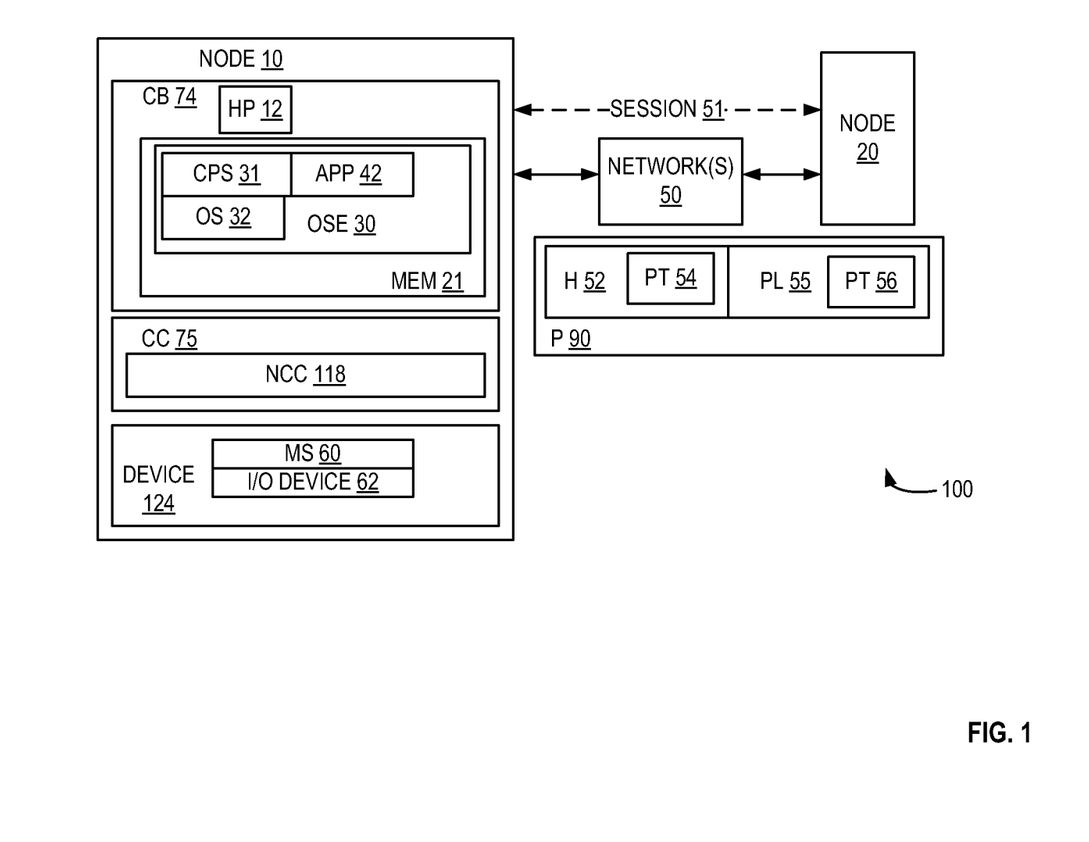
FIG. 1 illustrates a system embodiment.

FIG. 1 illustrates a system embodiment 100. System 100 may include node 10 that may be communicatively coupled to node 20 via one or more wireless and/or wired networks 50. Each of the nodes 10 and 20 may be geographically remote from each other. In this embodiment, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

Node 10 may comprise circuit board (CB) 74, circuit card (CC) 75, and device 124. In this embodiment, CB 74 may comprise, for example, a system motherboard that may be physically and communicatively coupled to CC 75 via a not shown bus connector/slot system. CB 74 may comprise one or more single and/or multi-core host processors (HP) 12 and computer-readable/writable memory 21. Although not shown in the Figures, CB 74 also may comprise one or more chipsets (comprising, e.g., memory and/or input/output controller circuitry). One or more host processors 12 may be communicatively coupled via the one or more chipsets to memory 21, CC 75, and/or device 124.

CC 75 may comprise network controller circuitry (NCC) 118. NCC 118 and/or CC 75 may be directly communicatively coupled to device 124. Alternatively or additionally, NCC 118 and/or CC 75 may be communicatively coupled to device 124 via the one or more not shown chipsets.

Alternatively or additionally, although not shown in the Figures, some or all of NCC 118 and/or the functionality and components thereof may be comprised in, for example, CB 74 (e.g., in one or more host processors 12 and/or the one or more not shown chipsets). Also alternatively, one or more host processors 12, memory 21, the one or more not shown chipsets, and/or some or all of the functionality and/or components thereof may be comprised in, for example, NCC 118 and/or CC 75. Many other alternatives are possible without departing from this embodiment.

Device 124 may be or comprise mass storage (MS) and/or one or more I/O devices 62. In this embodiment, the terms "device" and "I/O device" may be used interchangeably, and may mean circuitry capable of, at least in part, receiving, processing, and/or transmitting data and/or one or more commands. For example, in this embodiment, one or more I/O devices 62 may include, at least in part, one or more media, audio, video, security, display, and/or imaging devices. Also in this embodiment, "storage," "storage device," "mass storage," and "mass storage device" may be used interchangeably to mean one or more apparatus into, and/or from which, data may be stored and/or retrieved, respectively. In this embodiment, mass storage 60 may comprise storage capable of non-volatile storage of data. For example, in this embodiment, mass storage 60 may include, without limitation, one or more non-volatile magnetic, optical, and/or semiconductor storage devices.

Although not shown in the Figures, node 20 may comprise, in whole or in part, respective components and/or functionality of node 10. As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, one or more host processors, storage, mass storage, one or more nodes, and/or memory. Although not shown in the Figures, node 10 may comprise a graphical user interface system (which, for example, may comprise or be comprised in, at least in part, one or more devices 124 and/or 62. The not shown graphical user interface system may comprise, e.g., a respective keyboard, pointing device, and display system that may permit a human user to input commands to, and monitor the operation of, node 10, node 20, and/or system 100.

Memory 21 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. One or more machine-readable program instructions may be stored in memory 21 and/or NCC 118. In operation of node 10, these instructions may be accessed and executed by one or more host processors 12 and/or NCC 118. When executed by one or more host processors 12, these one or more instructions may result in operating system environment (OSE) 30 being executed at least in part by one or more host processors 12, and becoming resident at least in part in memory 21. Also when executed by one or more host processors 12 and/or NCC 118, these one or more instructions may result in one or more host processors 12, NCC 118, OSE 30, and/or one or more components thereof, performing operations described herein as being performed by these components of system 100.

In this embodiment, an operating system environment may be or comprise one or more portions of one or more operating systems, one or more communication protocol stacks, one or more applications, one or more interfaces, one or more programs, one or more associated processes, and/or one or more portions thereof. For example, in this embodiment, OSE 30 may comprise, for example, operating system 32, one or more applications 42, and/or communication protocol stack 31. In this embodiment, stack 31, one or more applications 42, and/or operating system 32 may comprise, at least in part, mutually distinct processes. Alternatively, without departing from this embodiment, operating system 32 may comprise one or more applications 42 and/or stack 31, or vice versa.

In this embodiment, a portion of an entity may comprise all or less than all of the entity. Also, in this embodiment, a process, program, driver, operating system, and application may be used interchangeably, and may comprise and/or result at least in part from execution of one or more program instructions. In this embodiment, a communication protocol stack may comprise one or more processes involved, at least in part, in protocol processing. In this embodiment, protocol processing may involve, at least in part, receiving, transmitting, storing, translating, re-formatting, and/or modifying at least one portion of at least one packet. Also in this embodiment, a packet may comprise one or more symbols and/or values.

NCC 118 may exchange data and/or commands with one or more nodes 20 via one or more networks 50 in accordance with one or more communication protocols. For example, in this embodiment, these one or more protocols may be compatible with, e.g., an Ethernet protocol, Transmission Control Protocol/Internet Protocol (TCP/IP) protocol, User Datagram Protocol (UDP), and/or Real-time Protocol/Real-time Transport Control Protocol (RTP/RTCP).

The Ethernet protocol that may be utilized in system 100 may comply or be compatible with the protocol described in Institute of Electrical and Electronics Engineers, Inc. (IEEE) Std. 802.3, 2000 Edition, published on Oct. 20, 2000. The TCP/IP protocol that may be utilized in system 100 may comply or be compatible with the protocols described in Internet Engineering Task Force (IETF) Request For Comments (RFC) 791 and 793, published September 1981. The UDP protocol that may be utilized in system 100 may comply or be compatible with the protocol described in IETF RFC 768, published 28 Aug. 1980. The RTP/RTCP protocol that may be utilized in system 100 may comply or be compatible with one or more of the protocols described in IETF RFC 3550, published July 2003 and/or IETF RFC 5506, published April 2009. Although the following description of system 100 will proceed with particular reference being made to TCP, many different, additional, and/or other protocols (including, for example, those stated above) may be used for such data and/or command exchange without departing from this embodiment (e.g., earlier and/or later-developed versions of the aforesaid and/or other protocols).

Figure 5:
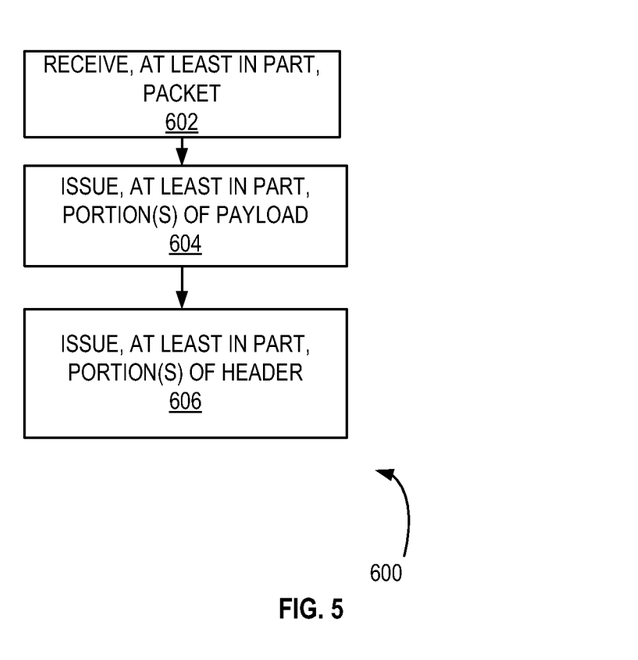
FIG. 5 illustrates operations in an embodiment.

Particular reference now is being specifically made to FIGS. 1 and 5. FIG. 5 illustrates operations 600 that may be performed in system 100. In operation of system 100, NCC 118 and node 20 may establish one or more sessions 51 between themselves via one or more networks 50. One or more packets 90 may be issued from node 20 to NCC 118 via one or more sessions 51 and/or one or more networks 50. NCC 118 may receive, at least in part, one or more packets (P) 90 from one or more networks 50 via one or more sessions 51, as illustrated by operation 602. In this embodiment, a session may comprise an exchange of data and/or commands between or among at least two entities.

The one or more packets 90 may comprise one or more headers (H) 52 and one or more payloads (PL) 55. In this embodiment, a header and a payload each may comprise, respectively, one or more respective portions of a packet. For example, one or more headers 52 may be or comprise one or more TCP headers, and one or more payloads 55 may be or comprise one or more TCP payloads, respectively.

For purposes of illustrative example, specific reference is made hereafter to operations directed to the modification, at least in part, of one or more portions (e.g., sequence number, size information, checksum, and/or payload) of one or more TCP packets by NCC 118. However, it should be appreciated that NCC 118 may make, in addition to these modifications, corresponding and/or related modifications to corresponding and/or related portions of one or more other packets (e.g., IP packets) that may be encapsulated in and/or associated with such TCP packets.

In this embodiment, one or more packets 90 may be associated, at least in part, with one or more applications 42 and/or one or more devices 124. For example, one or more portions (PT) 56 of one or more payloads 55 may be or include data associated with, destined for, intended to be received, and/or processed, at least in part, by one or more applications 42 and/or one or more devices 124. Also, for example, one or more portions (PT) 54 of one or more headers 52 may be or include data identifying, at least in part, one or more sessions 51, one or more applications 42, and/or one or more devices 124.

For example, after receiving, at least in part, one or more packets 90, NCC 118 may examine, at least in part, one or more portions 54 of one or more headers 52. Based at least in part upon this examination, NCC 118 may determine, at least in part, whether one or more packets 90 are associated, at least in part, with one or more particular sessions (e.g., shown symbolically as one or more sessions (S) 406A in FIG. 3) comprised in a set 404 of one or more predetermined sessions (shown symbolically as 406A ... 406N). This determination may be based, at least in part, upon parameters such as socket identification, source and/or destination ports, IP addresses, and/or one or more other parameters (e.g., as determined by the application). Based at least in part upon whether one or more packets 90 are associated, at least in part, with one or more particular sessions 406A, NCC 118 may issue, at least in part, one or more portions 56 of one or more payloads 55 to one or more intended destination devices 124, as illustrated by operation 604 in FIG. 3. For example, one or more sessions 51 may be or comprise one or more sessions 406A, NCC 118 may so determine, and as part of operation 604, NCC 118 may issue, at least in part, one or more portions 56 to one or more devices 124. As part of operation 604, NCC 118 may issue, at least in part, one or more portions 56 to one or more devices 124 in a manner (described below) that by-passes involvement of stack 31 in processing one or more portions 56.

Conversely, NCC 118 may determine, based at least in part upon its examination, at least in part, of one or more portions 54 of one or more headers 52 that one or more packets 90 are associated, at least in part, with one or more other sessions (e.g., shown symbolically as one or more sessions 412A in FIG. 3) comprised in another set 414 of one or more other sessions (shown symbolically as 412A ... 412N). For example, one or more sessions 51 may be or comprise one or more sessions 412A. In this embodiment, set 414 and set 404 may be mutually disjoint from each other. For example, set 414 may not have any elements in common with set 404. If NCC 118 determines, at least in part, that one or more packets 90 are associated with one or more such sessions 412A, NCC 118 may issue one or more packets 90 (including, e.g., one or more headers 52 and one or more payloads 55) to stack 31. Thereafter, stack 31 may process one or more packets 90.

Figure 3:
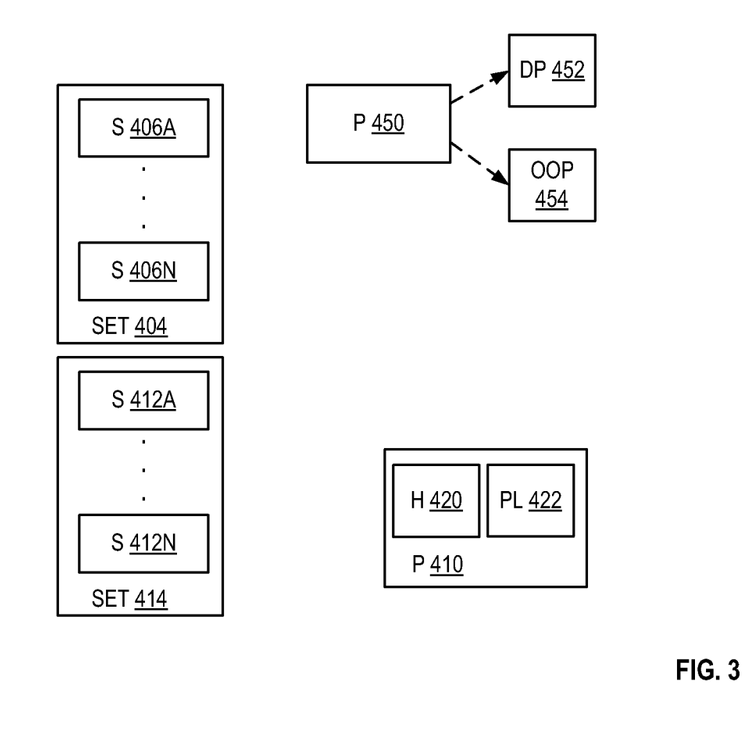
FIG. 3 illustrates features in an embodiment.

One or more sessions 406A ... 406N may be one or more relatively persistent sessions for the purpose of, for example, at least in part, file download, media (e.g., audio, video, and/or imaging) streaming/transfer, and/or voice-over-IP transmission from node 20 to node 10. One or more applications 42 and/or one or more devices 124 may be associated with, involved in, and/or facilitate, at least in part, one or more such purposes. However, the one or more sessions 412A ... 412N may not be one or more such relatively persistent sessions.

As stated previously, if NCC 118 determines, at least in part, that one or more packets 90 are associated, at least in part, with one or more sessions 406A, then, as part of operation 604, NCC 118 may issue, at least in part, one or more portions 56 to one or more devices 124 in a manner that by-passes involvement of stack 31 in processing one or more portions 56. NCC 118 may accomplish this, at least in part, by storing, at least in part, one or more portions 56 in one or more locations 504 in memory 501 that may be associated with and/or comprised in, at least in part, one or more devices 124 (see FIG. 4) associated with, at least in part, the one or more sessions 406A and/or one or more applications 42. This may be carried out, at least in part, via one or more direct memory access (DMA) transfers 502A ... 502N of one or more portions 56 from NCC 118 to one or more locations 504. In this embodiment, one or more applications 42 may have previously specified, at least in part, one or more devices 124, storage 60, and/or one or more devices 62 with which one or more applications 42 and/or one or more sessions 406A are to be associated, at least in part. NCC 118 may carry this out such that none of the one or more portions 56 may be transferred to stack 31.

Figure 4:
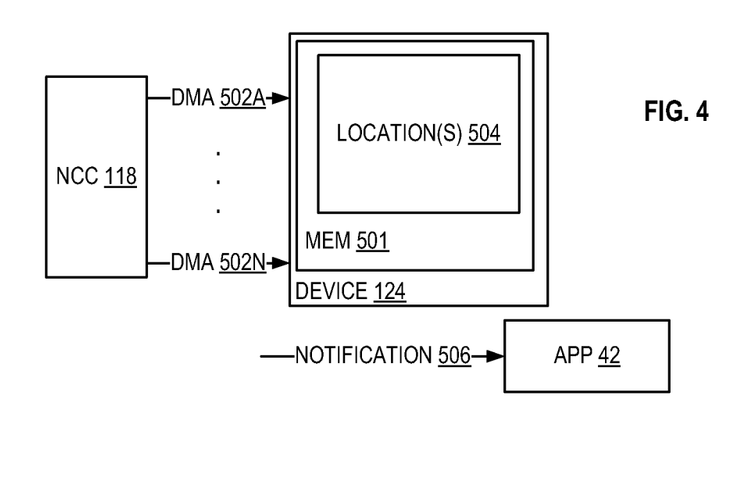
FIG. 4 illustrates operations in an embodiment.

NCC 118 may issue, at least in part, one or more notifications 506 to one or more applications 42 to notify, at least in part, one or more applications 42 of one or more locations 504. Based at least in part upon the one or more notifications 506, one or more applications 42 may access, process, and/or utilize, at least in part, the one or more portions 56 stored, at least in part, at one or more locations 504.

Figure 2:
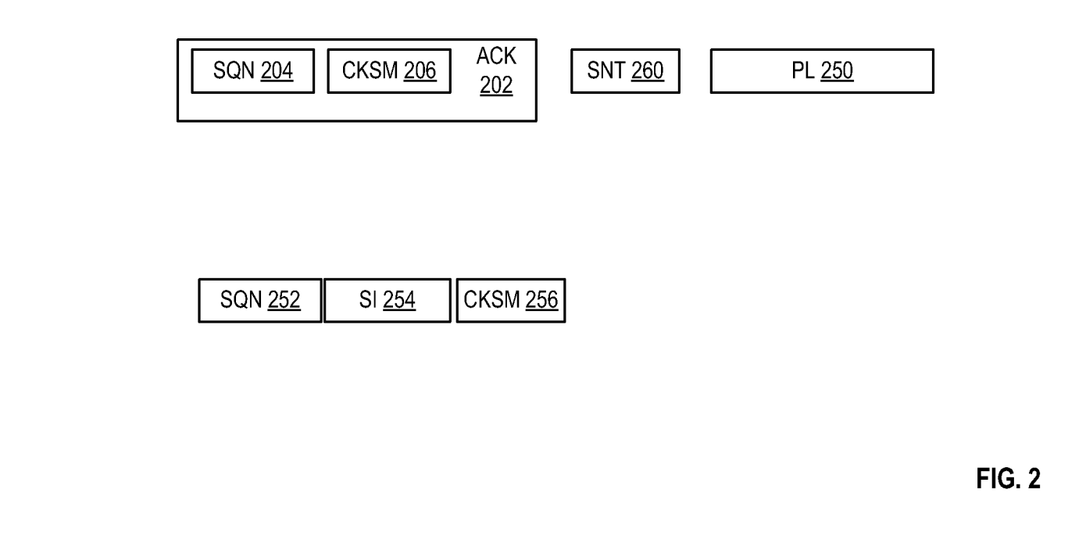
FIG. 2 illustrates features in an embodiment.

With reference to FIG. 2, instead of issuing one or more portions 56 and/or one or more payloads 55 to one or more applications 42, NCC 118 may issue, at least in part, one or more payloads 250 to one or more applications 42 via stack 31. In this embodiment, one or more payloads 250 may be different, at least in part, from one or more payloads 55 and/or one or more portions 56. For example, one or more payloads 250 may comprise one or more dummy bytes, and may have a predetermined size that is smaller than that of one or more portions 56 and/or one or more payloads 55. This may be done in order to prevent the stack 31 from signaling an error condition as a result of there not being one or more payloads associated with the one or more headers being sent to the stack 31. However, if the stack 31 does not implement one or more reliable protocols (e.g., TCP) but instead, implements an unreliable protocol (e.g., UDP) that does not perform such a data integrity check, NCC 118 may not issue such a modified payload to the stack 31. After receiving one or more payloads 250, one or more applications 42 may ignore, at least in part, one or more payloads 250. For example, after receiving one or more payloads 250, one or more applications 42 may simply drop (e.g., not process further and permit to be overwritten in memory 21) one or more payloads 250.

Contemporaneously, after, or prior to, at least in part, performing operation 604 and/or issuing one or more payloads 250 to stack 31, NCC 118 may issue, at least in part, one or more portions 54 of one or more headers 52 to stack 31 (see operation 606 in FIG. 5). Prior to issuing, at least in part, one or more portions 54 of one or more headers 52 to stack 31, NCC 118 may modify, at least in part, TCP sequence number (SQN) 252, TCP size information (SI) 254, and/or TCP checksum (CKSM) 256 that may be comprised, at least in part, in the one or more portions 54. As issued, at least in part, to stack 31 by NCC 118, one or more portions 54 may include, at least in part, the thus modified sequence number 252, size information 254, and/or checksum 256.

For example, sequence number 252 may be modified, at least in part, by NCC 118 so as to reflect the size of the one or more payloads 250 that may be issued to stack 31 (e.g., instead of comporting with the size of one or more payloads 55 of the one or more packets 90 as received by NCC 118 from one or more networks 50) and the sequence number of the last header belonging to one or more sessions 406A that was previously issued to the stack 31 by NCC 118. NCC 118 may store and/or maintain a sequence number translation (SNT) 260 that may map and/or correlate, at least in part, the sequence numbers of headers received by NCC 118 via one or more respective sessions 406A . . . 406N with the respective modified sequence numbers of modified headers issued by NCC 118 to stack 31. Accordingly, NCC 118 may modify, at least in part, sequence number 252 based at least in part upon SNT 260 and/or the size of one or more payloads 250.

NCC 118 may modify, at least in part, size information 254 based at least in part upon and/or so to reflect the modified sequence number 252 and/or the size of one or more payloads 250. NCC 118 may modify, at least in part, checksum 256 based at least in part upon and/or so as to reflect the modified sequence number 252, the modified size information 254, and/or the size of one or more payloads 250.

Stack 31 may recalculate the checksum of the one or more portions 54 of the one or more headers 52 that it receives from NCC 118. Stack 31 may compare the recalculated checksum to the modified checksum 256 from the one or more portions 54 that stack 31 received from NCC 118. Stack 31 also may compare the modified sequence number and the modified size information to an expected sequence number and an expected size, respectively. The expected sequence number and expected size may be calculated, in accordance with TCP, by the stack 31 based at least in part upon the one or more portions 54 and one or more payloads 250 that stack 31 receives from NCC 118, and previous parameters of the one or more sessions 406A.

If no error is detected by stack 31 as a result of these comparisons, stack 31 may generate, at least in part, based at least in part upon the one or more portions 54 that it received from NCC 118, a TCP acknowledgement (ACK) 202 to node 20 that node 10 has received one or more packets 90 without error. Stack 31 may issue, at least in part, the acknowledgement 202 to NCC 118.

NCC 118 may determine whether the acknowledgement 202 belongs to and/or may be associated with one or more sessions (e.g., one or more sessions 406A) in set 404, or conversely, may be associated with one or more sessions in set 414. If the received acknowledgement is not associated with one or more sessions in set 404, NCC 118 may transmit the acknowledgement to node 20 via one or more networks 50.

Conversely, if acknowledgement 202 is associated with one or more sessions 406A in set 404, NCC 118 may process acknowledgement 202 in the following manner. As received by NCC 118 from stack 31, acknowledgement 202 may include expected TCP sequence number 204 that may be based at least in part upon and/or so as to reflect the one or more portions 54 and one or more payloads 250 that stack 31 previously received from NCC 118 and previous parameters of the one or more sessions 406A. Also, as received by NCC 118 from stack 31, acknowledgement 202 may include checksum 206 that may have been calculated based at least in part upon and/or so as to reflect sequence number 204.

In response, at least in part, to the acknowledgement 202 from stack 31, NCC 118 may modify, at least in part, sequence number 204 and checksum 206 in acknowledgement 202. NCC 118 may issue, at least in part, the acknowledgement 202, as thus modified, to node 20 via the one or more networks 50. For example, NCC 118 may modify, at least in part, sequence number 204 based upon, at least in part, a reverse translation, utilizing SNT 260, of the sequence number 204, as received from stack 31, to the corresponding sequence number that is expected to be received by node 20. NCC 118 may change the sequence number 204 in the acknowledgement 202 to be or comprise this corresponding sequence number resulting from the reverse translation. NCC 118 then may recalculate and/or modify the checksum 206 based at least in part upon and/or to reflect this change to the sequence number 204. NCC 118 then may issue, at least in part, the acknowledgement 202, as thus modified, to node 20.

The above assumes that stack 31 performs checksum calculations (e.g., related to initially generating checksums 206). However, if such calculations are offloaded to NCC 118, NCC 118 may generate such checksums in the first instance, without initial involvement of the stack 31.

Returning to FIG. 3, if NCC 118 receives, at least in part, one or more other packets 410 (e.g., other than one or more packets 90) from node 20, NCC 118 may examine and determine (in the manner described previously) one or more sessions with which the one or more other packets 410 may be associated, at least in part. In this example, one or more packets 410 may be associated with one or more sessions (e.g., one or more sessions 412A in set 414) that may be different, at least in part, from one or more sessions 406A. One or more packets 410 may comprise one or more headers 420 and one or more payloads 422. In this example, since one or more packets 410 are associated with one or more sessions 412A in set 414, instead of being associated with one or more sessions in set 404, NCC 118 may issue the one or more headers 420 and the one or more payloads 422 to stack 31 for processing. Conversely, however, if one or more packets 410 had been associated with one or more sessions in set 404, NCC 118 would have performed operations 604 and 606 (see FIG. 5) on one or more payloads 422 and one or more headers 420, respectively, in the manner previously described in connection with one or more packets 90.

Additionally, NCC 118 may receive, at least in part, one or more additional packets 450 from node 20. NCC 118 may examine and determine (in the manner described previously) one or more sessions with which the one or more other packets 450 may be associated, at least in part. In this example, if one or more packets 450 are associated with one or more sessions (e.g., one or more sessions 406A) in set 404, NCC 118 may determine whether one or packets 450 are one or more out-of-order packets 454 and/or duplicate packets 452. If NCC 118 determines that one or more packets 450 are one or more out-of-order packets 454 and/or duplicate packets 452, NCC 118 may drop the one or more packets 450 without performing operations 604 and/or 606 on one or more packets 450. Advantageously, this may permit proper reconstruction of one or more TCP segments that may comprise the one or more duplicate and/or out-of-order packets, based upon and/or in response to one or more related acknowledgements generated by the stack 31 (and as modified by NCC 118 in the manner described previously), without involving temporary storage of such packets by NCC 118.

The one or more sessions 51 may implement one or more secure communication protocols. Although not shown in the drawings, NCC 118 may comprise encryption/decryption circuitry that may permit NCC 118 to carry out the above operations even if one or more packets 90, 410, and/or 450 are encrypted in accordance with one or more such secure protocols. Additionally or alternatively, depending upon the one or more secure protocols implemented, NCC 118 may be capable of carrying out the above operations, without comprising such encryption/decryption circuitry. For example, if the one or more headers 52 are not encrypted, but one or more payloads 55 are encrypted, NCC 118 may be capable of carrying out the above operations, without comprising such encryption/decryption circuitry.

In this embodiment, "encryption" and/or "encrypting" may comprise one or more operations comprised in, facilitating, and/or resulting in, at least in part, generation of cipher text from plaintext. Also in this embodiment, "decryption" and/or "decrypting" may comprise one or more operations comprised in, facilitating, and/or resulting in, at least in part, generation of plaintext from cipher text. Additionally, in this embodiment, "plaintext" may include data that is, at least in part, encrypted and/or has already undergone and/or is presently undergoing encryption and/or decryption.

Thus, an embodiment may include network controller circuitry to be comprised in a first node. The node may be communicatively coupled to a network and may include a host processor to execute an operating system environment. The operating system environment may include, at least in part, a communication protocol stack and an application. The circuitry may receive, at least in part, a packet from the network. The packet may include, at least in part, a header and payload. At least one portion of the payload may be associated with the application. The circuitry may issue at least one portion of the header to the stack. The circuitry may issue the at least one portion of the payload to a destination device in a manner that by-passes involvement of the stack. The destination device may be specified, at least in part, by the application.

Thus, in this embodiment, for one or more predetermined/particular sessions 406A, NCC 118 may issue to and/or store directly (e.g., via one or more DMA transactions) one or more portions 56 of one or more payloads 55 in one or more locations 504 associated with one or more devices 124, without the involvement of the operating system environment 30, stack 31, and/or host processor 12. Advantageously, in this embodiment, this may reduce the number of operations involved in transferring and copying packet data to and from memory, and the amount of host memory consumed. Also advantageously, this may reduce the amount of host processor processing overhead and processing bandwidth consumed, as well as, the amount of host processor power consumption and heat generation in this embodiment. Further advantageously, this may result in improved packet processing throughput.

Also, in this embodiment, a stack 31 may be a conventional communication protocol stack that may be utilized for conventional processing of one or more other sessions 412A, and, from the perspective of the stack 31, the interactions between NCC 118 and stack 31 may appear to be carried out in a conventional fashion. Advantageously, this may reduce the cost of this embodiment, while maintaining the stack's conventional protocol processing, technological ecosystem, and operating system compatibility.

What is claimed is:

1. An apparatus comprising:
network controller circuitry to be comprised in a first node, the first node to be communicatively coupled to a network and including a host processor to execute an operating system environment, the operating system environment including, at least in part, a communication protocol stack and an application, the circuitry to receive, at least in part, a packet from the network, the packet including, at least in part, a header and payload, the circuitry to issue at least one portion of the header to the stack, at least one portion of the payload being associated with the application, the circuitry to issue the at least one portion of the payload to a destination device in a manner that by-passes involvement of the stack, the destination device being specified, at least in part, by the application;
wherein:
the network controller circuitry is to determine, at least in part, whether the packet is associated with a particular session, the particular session being comprised in a set of one or more predetermined sessions;
based at least in part upon whether the packet is associated with the particular session, the network controller circuitry is to issue the at least one portion of the payload to the destination device in the manner that by-passes the involvement of the stack;
the network controller circuitry also is to receive another packet that is associated with another session, the another session being comprised in another set of one or more respective sessions, the set of one or more predetermined sessions and the another set being mutually disjoint from each other;
the another packet comprises another header and another payload; and
the network controller circuitry is to issue the another header, at least in part, and the another payload, at least in part, to the stack.

2. The apparatus of claim 1, wherein:
a circuit card comprises, at least in part, the network controller circuitry; and
the first node comprises a circuit board to be coupled to the circuit card.

3. The apparatus of claim 1, wherein:
the communication protocol stack is to generate, at least in part, based at least in part upon the at least one portion of the header, an acknowledgement to a second node that the first node has received the packet, the acknowledgement including a sequence number;
the network controller circuitry is to modify, at least in part, the sequence number in the acknowledgement; and
the network controller circuitry is to issue, at least in part, the acknowledgement to the second node via the network.

4. The apparatus of claim 1, wherein:
the another payload is different, at least in part, from the at least one portion of the payload; and
prior to issuing the at least one portion of the header to the stack, the network controller circuitry is to modify, at least in part, a sequence number, size information, and checksum in the at least one portion of the header, the sequence number being modified, at least in part, based at least in part upon a sequence number translation, by the network controller circuitry, the size information and checksum being modified, at least in part, based at least in part upon the sequence number, as modified at least in part, and the another payload.

5. The apparatus of claim 1, wherein:
the network controller circuitry also is to receive a third packet that is associated with the particular session, the third packet being at least one of a duplicate packet and an out-of-order packet; and
after determining that the third packet is the at least one of the duplicate packet and the out-of-order packet, the network controller circuitry is to drop the third packet.

6. The apparatus of claim 1, wherein:
the network controller circuitry is to store, at least in part, via one or more direct memory transfers, the at least one portion of the payload at one or more locations associated with the destination device;

the application is to be notified, at least in part, of the one or more locations;

the another payload is different, at least in part, from the at least one portion of the payload; and the application is to ignore, at least in part, the another payload.

7. A method comprising:

receiving, at least in part, by network controller circuitry a packet from a network, the network controller circuitry to be comprised in a first node, the first node to be communicatively coupled to the network and including a host processor to execute an operating system environment, the operating system environment including, at least in part, a communication protocol stack and an application, the packet including, at least in part, a header and payload;

issuing from the circuitry at least one portion of the header to the stack, at least one portion of the payload being associated with the application; and issuing from the circuitry the at least one portion of the payload to a destination device in a manner that by-passes involvement of the stack, the destination device being specified, at least in part, by the application;

wherein:

the network controller circuitry is to determine, at least in part, whether the packet is associated with a particular session, the particular session being comprised in a set of one or more predetermined sessions;

based at least in part upon whether the packet is associated with the particular session, the network controller circuitry is to issue the at least one portion of the payload to the destination device in the manner that by-passes the involvement of the stack;

the network controller circuitry also is to receive another packet that is associated with another session, the another session being comprised in another set of one or more respective sessions, the set of one or more predetermined sessions and the another set being mutually disjoint from each other;

the another packet comprises another header and another payload; and the network controller circuitry is to issue the another header, at least in part, and the another payload, at least in part, to the stack.

8. The method of claim 7, wherein:

a circuit card comprises, at least in part, the network controller circuitry; and the first node comprises a circuit board to be coupled to the circuit card.

9. The method of claim 7, wherein:

the communication protocol stack is to generate, at least in part, based at least in part upon the at least one portion of the header, an acknowledgement to a second node that the first node has received the packet, the acknowledgement including a sequence number;

the network controller circuitry is to modify, at least in part, the sequence number in the acknowledgement; and the network controller circuitry is to issue, at least in part, the acknowledgement to the second node via the network.

10. The method of claim 7, wherein:

the another payload is different, at least in part, from the at least one portion of the payload; and prior to issuing the at least one portion of the header to the stack, the network controller circuitry is to modify, at least in part, a sequence number, size information, and checksum in the at least one portion of the header, the sequence number being modified, at least in part, based at least in part upon a sequence number translation, by the network controller circuitry, the size information and checksum being modified, at least in part, based at least in part upon the sequence number, as modified at least in part, and the another payload.

11. The method of claim 7, wherein:

the network controller circuitry also is to receive a third packet that is associated with the particular session, the third packet being at least one of a duplicate packet and an out-of-order packet; and after determining that the third packet is the at least one of the duplicate packet and the out-of-order packet, the network controller circuitry is to drop the third packet.

12. The method of claim 7, wherein:

the network controller circuitry is to store, at least in part, via one or more direct memory transfers, the at least one portion of the payload at one or more locations associated with the destination device;

the application is to be notified, at least in part, of the one or more locations;

the another payload is different, at least in part, from the at least one portion of the payload; and the application is to ignore, at least in part, the another payload.

13. Computer-readable memory storing one or more instructions that when executed by a machine result in performance of operations comprising:

receiving, at least in part, by network controller circuitry a packet from a network, the network controller circuitry to be comprised in a first node, the first node to be communicatively coupled to the network and including a host processor to execute an operating system environment, the operating system environment including, at least in part, a communication protocol stack and an application, the packet including, at least in part, a header and payload;

issuing from the circuitry at least one portion of the header to the stack, at least one portion of the payload being associated with the application; and issuing from the circuitry the at least one portion of the payload to a destination device in a manner that by-passes involvement of the stack, the destination device being specified, at least in part, by the application;

wherein:

the network controller circuitry is to determine, at least in part, whether the packet is associated with a particular session, the particular session being comprised in a set of one or more predetermined sessions;

based at least in part upon whether the packet is associated with the particular session, the network controller circuitry is to issue the at least one portion of the payload to the destination device in the manner that by-passes the involvement of the stack;

the network controller circuitry also is to receive another packet that is associated with another session, the another session being comprised in another set of one or more respective sessions, the set of one or more predetermined sessions and the another set being mutually disjoint from each other;

the another packet comprises another header and another payload; and the network controller circuitry is to issue the another header, at least in part, and the another payload, at least in part, to the stack.

14. The memory of claim 13, wherein:
a circuit card comprises, at least in part, the network controller circuitry; and
the first node comprises a circuit board to be coupled to the circuit card.

15. The memory of claim 13, wherein:
the communication protocol stack is to generate, at least in part, based at least in part upon the at least one portion of the header, an acknowledgement to a second node that the first node has received the packet, the acknowledgement including a sequence number;
the network controller circuitry is to modify, at least in part, the sequence number in the acknowledgement; and
the network controller circuitry is to issue, at least in part, the acknowledgement to the second node via the network.

16. The memory of claim 13, wherein:
the another payload is different, at least in part, from the at least one portion of the payload; and
prior to issuing the at least one portion of the header to the stack, the network controller circuitry is to modify, at least in part, a sequence number, size information, and checksum in the at least one portion of the header, the sequence number being modified, at least in part, based at least in part upon a sequence number translation, by the network controller circuitry, the size information and checksum being modified, at least in part, based at least in part upon the sequence number, as modified at least in part, and the another payload.

17. The memory of claim 13, wherein:
the network controller circuitry also is to receive a third packet that is associated with the particular session, the third packet being at least one of a duplicate packet and an out-of-order packet; and
after determining that the third packet is the at least one of the duplicate packet and the out-of-order packet, the network controller circuitry is to drop the third packet.

18. The memory of claim 13, wherein:
the network controller circuitry is to store, at least in part, via one or more direct memory transfers, the at least one portion of the payload at one or more locations associated with the destination device;
the application is to be notified, at least in part, of the one or more locations;
the another payload is different, at least in part, from the at least one portion of the payload; and
the application is to ignore, at least in part, the another payload.

* * * * *